United States Patent
von Berge

(10) Patent No.: US 11,035,013 B2
(45) Date of Patent: Jun. 15, 2021

(54) USE OF HYDROXY FUNCTIONAL WATERBORNE RESINS TO CREATE URETHANE CROSSLINKING IN LEATHER FINISHES

(71) Applicant: LEAR CORPORATION, Southfield, MI (US)

(72) Inventor: Robert von Berge, Rochester Hills, MI (US)

(73) Assignee: LEAR CORPORATION, Southfield, MI (US)

( * ) Notice: Subject to any disclaimer, the term of this patent is extended or adjusted under 35 U.S.C. 154(b) by 325 days.

(21) Appl. No.: 15/928,799

(22) Filed: Mar. 22, 2018

(65) Prior Publication Data

US 2019/0292612 A1   Sep. 26, 2019

(51) Int. Cl.
| | |
|---|---|
| *C14C 11/00* | (2006.01) |
| *B05D 3/02* | (2006.01) |
| *B05D 7/12* | (2006.01) |
| *C08G 18/38* | (2006.01) |
| *C08G 18/42* | (2006.01) |
| *C08G 18/46* | (2006.01) |
| *C08G 18/62* | (2006.01) |
| *C08G 18/73* | (2006.01) |

(52) U.S. Cl.
CPC .......... *C14C 11/006* (2013.01); *B05D 3/0254* (2013.01); *B05D 7/12* (2013.01); *C08G 18/3893* (2013.01); *C08G 18/42* (2013.01); *C08G 18/4615* (2013.01); *C08G 18/6254* (2013.01); *C08G 18/73* (2013.01)

(58) Field of Classification Search
CPC ....... C14C 11/006; B05D 3/0254; B05D 7/12; C08G 18/3893; C08G 18/42; C08G 18/4615; C08G 18/6254; C08G 18/73
USPC ...................................................... 427/385.5
See application file for complete search history.

(56) References Cited

U.S. PATENT DOCUMENTS

| | | |
|---|---|---|
| 5,905,113 A | 5/1999 | Ulrike et al. |
| 9,200,404 B2 | 12/2015 | Grzesiak et al. |
| 2003/0153713 A1 | 8/2003 | Spyrou et al. |
| 2004/0219367 A1 | 11/2004 | Spyrou et al. |
| 2005/0119437 A1 | 6/2005 | Wenning et al. |
| 2014/0162073 A1* | 6/2014 | Grzesiak .............. C08G 18/283 428/422.8 |

* cited by examiner

*Primary Examiner* — Ling Siu Choi
*Assistant Examiner* — Ronald Grinsted
(74) *Attorney, Agent, or Firm* — Brooks Kushman P.C.

(57) ABSTRACT

A coating composition includes at least one, low Tg, polyol resin having hydroxyl groups available for crosslinking, a polyurethane crosslinker that crosslinks the hydroxyl groups when cured, and water in an amount from about 4 to 20 wt. % of the total weight of the coating composition. Characteristically, solvents other than water are present in an amount less than half the amount of water. The coating composition is advantageously used to finish leather.

19 Claims, No Drawings

USE OF HYDROXY FUNCTIONAL WATERBORNE RESINS TO CREATE URETHANE CROSSLINKING IN LEATHER FINISHES

TECHNICAL FIELD

In at least one aspect, the present invention is related to coating compositions and to methods for coating leather.

BACKGROUND

Leather finishing is predominately performed using waterborne coating systems. Current resins used in these applications are not functionalized for crosslinking and instead rely on coalescence of high molecular weight resins (≥2000 Mw) to obtain performance. Certain isocyanate crosslinkers are also frequently used, however these crosslinkers do not crosslink with the finish resins to form urethanes but instead create a so called inter-penetrating network (IPN) of urea linkages by self-condensing with themselves. In particular, the current molecular weight/IPN driven technology struggles with increasing crosslink density for cohesive properties that hardens the system at the expense of flexibility.

Accordingly, there is a need for improved leather finishing coating with increased crosslinking density.

SUMMARY

The present invention solves one or more problems of the prior art by providing in at least one embodiment a coating composition for finishing leather. The coating composition includes at least one polyol resin having hydroxyl groups available for crosslinking, a polyurethane crosslinker that crosslinks the hydroxyl groups when cured, and water in an amount from about 4 to 20 wt. % of the total weight of the coating composition. Characteristically, solvents other than water are present in an amount less than half the amount of water. The coating composition is advantageously used to finish leather.

In another embodiment, a method for coating a substrate and in particular, a leather substrate, is provided. The method includes a step of applying the coating composition set forth above to a substrate to form an uncured coating on the substrate.

Advantageously, embodiments of the invention allow formulator to increase the urethane crosslink density of the system to maximize performance and at the same time maintain flexibility.

DETAILED DESCRIPTION

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: all R groups (e.g. $R_i$ where i is an integer) include alkyl, lower alkyl, $C_{1-6}$ alkyl, $C_{6-10}$ aryl, or $C_{6-10}$ heteroaryl; single letters (e.g., "n" or "o") are 1, 2, 3, 4, or 5; percent, "parts of," and ratio values are by weight; the term "polymer" includes "oligomer," "copolymer," "terpolymer," and the like; molecular weights provided for any polymers refers to weight average molecular weight unless otherwise indicated; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

With respect to the terms "comprising," "consisting of," and "consisting essentially of," where one of these three terms is used herein, the presently disclosed and claimed subject matter can include the use of either of the other two terms.

The term "alkyl" refers to $C_{1-20}$ inclusive, linear (i.e., "straight-chain"), branched, saturated or at least partially and in some cases fully unsaturated (i.e., alkenyl and alkynyl) hydrocarbon chains, including for example, methyl, ethyl, propyl, isopropyl, butyl, isobutyl, tert-butyl, pentyl, hexyl, octyl, ethenyl, propenyl, butenyl, pentenyl, hexenyl, octenyl, butadienyl, propynyl, butynyl, pentynyl, hexynyl, heptynyl, and allenyl groups. "Branched" refers to an alkyl group in which a lower alkyl group, such as methyl, ethyl or propyl, is attached to a linear alkyl chain. "Lower alkyl" refers to an alkyl group having 1 to about 8 carbon atoms (i.e., a C18 alkyl), e.g., 1, 2, 3, 4, 5, 6, 7, or 8 carbon atoms. "Higher alkyl" refers to an alkyl group having about 10 to about 20 carbon atoms, e.g., 10, 11, 12, 13, 14, 15, 16, 17, 18, 19, or 20 carbon atoms.

Throughout this application, where publications are referenced, the disclosures of these publications in their entireties are hereby incorporated by reference into this application to more fully describe the state of the art to which this invention pertains.

The term "aqueous" means water or water mixed with 50 wt. % or less, based on the weight of the mixture, of water-miscible solvent.

The term "copolymer" means copolymers, terpolymers, tetrapolymers, pentapolymers or hexapolymers, and also to random, block and graft copolymers.

The term "low $T_g$ monomer" means any monomer, a homopolymer of which will have a $T_g$ of 10° C. or below.

Abbreviations:
"NMP" means N-methylpyrrolidone
"$T_g$" means glass transition temperature.

In an embodiment, a coating composition for finishing leather is provided. The coating composition includes at least one polyol resin having hydroxyl groups (i.e., polyhydroxylated resins) available for crosslinking, a polyurethane crosslinker that crosslinks the hydroxyl groups when cured, and water in an amount from about 30-80 wt. % of the total weight of the coating composition. In a refinement, water is present in an amount from about 30-80 wt. % of the total weight of the coating composition. Therefore, the solvent used in the coating composition is an aqueous solvent system. Therefore, the coating composition can include other solvents that are miscible with water such as alcohols (e.g., methanol, ethanol, propanol, etc.) and ethylene glycol. Characteristically, solvents other than water are present in an amount less than 10% of the total. The coating composition is advantageously used to finish leather.

In a variation, the at least one polyol resin includes a resin with glass transition temperatures (Tg) less than 35° C. In a refinement, the at least one polyol resin includes a first resin with glass transition temperatures greater than, in increasing order of preference, −100° C., −80° C., −60° C., −40° C., −20° C., or 0° C., and less than 10° C. In a further refinement, the least one polyol resin has an equivalent weight from about 200 to 2500 with respect to the hydroxyl groups. In a refinement, the at least one polyol resin is a mixture of polyol resins that includes the first resin as well as an additional polyol selected from the group consisting of a hydroxy-functional NMP-free polyester-urethane dispersion with a glass transition temperature less than −20° C. (e.g., Bayhydrol U XP 2698), a hydroxy-functional polyacrylic dispersion (PAC) with a glass transition temperature less than OC (e.g., Bayhydrol A2058), an polyester diol with a weight average molecular weight that is less than 1000 with a glass transition temperature less than −20° C. (e.g., A308), and combinations thereof. The mixture of polyol resins can include any 1, 2, or 3 or all of these additional polyol resins. In a refinement, each of these additional polyols can independently be present in an amount from 0 to 15 weight percent of the total weight of the coating composition. In another refinement, each of these additional polyols can independently be present in an amount from 1 to 10 weight percent of the total weight of the coating composition.

Typically, the at least one polyol resin includes a component selected from the group consisting of hydroxylated polycarbonate, hydroxylated polyester, polyurethane polyol, acrylic polyol, acrylic diol, and copolymers thereof, and combinations thereof. In a refinement, the at least one polyol resin includes a hydroxylated polyester urethane present in an amount of 40 to 80 wt. % of the total weight of the coating composition. In a particularly useful example, the at least one polyol resin includes an hydroxylated polyester urethane, a polyurethane polyol, an acrylic polyol, and acrylic diol. In a further refinement, the at least one polyol resin includes a hydroxylated polyester in an amount of 40 to 80 wt. % of the total weight of the coating composition, a polyurethane polyol in an amount of 1 to 10 wt. % of the total weight of the coating composition, an acrylic polyol in and amount of 1 to 10 wt. % of the total weight of the coating composition, and an acrylic diol in an amount of 1 to 10 wt. % of the total weight of the coating composition.

In a variation, hydroxylated polyesters include hydroxyl groups distributed along the molecular chain of each individual polyester molecule. Similarly, the hydroxylated polycarbonate, polyurethane polyol, and the acrylic polyol each contains a plurality of pendent hydroxyl groups distributed along the molecular chain of each individual respective polymer molecule. In another variation, hydroxylated polyesters are silicone-modified hydroxylated polyester urethane resins as the main resin component.

As set forth above, the coating composition includes a polyurethane crosslinker. The polyurethane cross linker includes at least 2 isocyanate groups available for crosslinking. In a refinement, the polyurethane cross linker includes 2, 3, 4, 5, or more isocyanate groups available for crosslinking. The polyurethane crosslinker can be an oligomer or polymer. Aliphatic oligomers (e.g., hexamethylene diisocyanate) are found to be particularly useful. A particularly useful oligomer is a trimer, tetramer, or pentamer of hexamethylene diisocyanate and combinations thereof. In a variation, the polyurethane crosslinker is described by the following formula:

$$R—(NCO)_n \quad (1)$$

where n is an integer equal to or greater than 2 (e.g. 2-10) and R is a resin, an oligomer or a $C_{2-40}$ hydrocarbon group that optionally includes one or more double bonds and optionally substituted with N, O, and S. Specific examples of R include $C_{1-20}$ alkyl. In this regard, the isocyanate trimer of hexamethylene diisocyanate has the following formula:

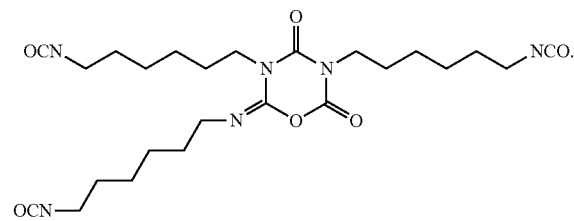

In typical applications, the coating composition can include one or more additives in relatively low amounts in order to provide important properties to the coating composition. Typical additives include rheology modifiers, viscosity adjusting agents, leveling agents, duller agents, surfactants, defoamers, organic solvents, pH adjusters, dispersants, coalescents, light stabilizers biocides and combinations thereof. In a variation, the additives are collectively present in an amount from about 0.1 to 10 weight percent. In a refinement, the additives are collectively present in an amount from about 1 to 5 weight percent. It should be appreciated that other well-known additives can be utilized to provide additional properties. In a refinement, each of the following additives are independently optionally present in an amount greater than 0.01, 0.05, 1.0, 2.0, 3.0 or 4.0 weight present of the total weight of the coating composition and in an amount less than 15.0, 10.0, 9.0, 8.0, 7.0, or 6.0 weight present of the total weight of the coating composition.

In another embodiment, a method for coating a substrate and in particular, a leather substrate, is provided. The method includes a step of applying a coating composition to a substrate to form an uncured coating on the substrate. The details of the coating composition are set forth above. The uncured coating composition is then cured to form a coated substrate. In a refinement, the curing is accomplished by allowing the uncured coating to air dry. In another refinement, the curing is accomplished by heating. Curing temperatures can be from about 50° C. to about 150° C. Air drying and heating for curing can also be combined.

The following examples illustrate the various embodiments of the present invention. Those skilled in the art will recognize many variations that are within the spirit of the present invention and scope of the claims.

Table 1 provides an exemplary composition for finishing leather.

| Component | Component | Type | Supplier | OH eq/wt (resin) | % NV | Amount | Range |
|---|---|---|---|---|---|---|---|
| Diluent | Water | | | | 0.00 | 6.24 | 5-10 |
| OH Binder | Almatex 437-36 | Si-mod, Hydroxy PUD | Anderson Development | 2110 | 23.50 | 57.14 | 50-70 |
| | Bayhydrol UXP 2698 | Urethane Polyol | Covestro | 1133 | 52.00 | 6.77 | 0-10 |
| | Bayhydrol A2058 | Acrylic Polyol | Covestro | 356 | 41.90 | 1.58 | 0-10 |
| | A308 | Polyester Diol | King Industries | 216 | 100.00 | 3.15 | 0-10 |
| Flow/Leveling | BS-088N | Fluorinated Flow Aid | Quaker | | | 1.29 | 0-5 |
| | ROSILK 2229 | Silicone | Lanxess | | | 6.00 | 0-10 |
| | Melio WF-5227.A liq | Wax | Stahl | | | 2.57 | 0-5 |
| Duller | DC601T | Polymeric Duller | Dow | | | 5.58 | 0-8 |
| Viscosity Adjust | SL-25 | Laponite | Byk | | | 1.89 | 0-5 |
| | Water | | | | | 6.24 | 5-10 |
| Crosslinker | AQUADERM XL 100 | HDI Trimer | Lanxess | 210 | 100.00 | 6.26 | 4-10 |
| | Total | | | | | 100.00 | |
| | % NV (wt) | | | | | 36.81 | |
| | NCO/OH | | | | | 1.15 | |

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A coating composition comprising:
   at least one polyol resin having hydroxyl groups available for crosslinking wherein the at least one polyol resin includes a resin with glass transition temperatures less than 10° C.;
   a polyurethane crosslinker that crosslinks the hydroxyl groups when cured; and
   water in an amount from about 4 to 20 wt. % of the total weight of the coating composition wherein solvents other than water are present in an amount less than half the amount of water.

2. The coating composition of claim 1 wherein the at least one polyol resin has an equivalent weight from about 200 to 2500 with respect to the hydroxyl groups.

3. The coating composition of claim 2 wherein the at least one polyol resin is a mixture of polyol resins including a polyol selected from the group consisting of a hydroxy-functional NMP-free polyester-urethane dispersion with a glass transition temperature less than −20° C., a hydroxy-functional polyacrylic dispersion with a glass transition temperature less than 0° C., and a polyester diol with a weight average molecular weight that is less than 1000 with a glass transition temperature less than −20° C.

4. The coating composition of claim 1 wherein the at least one polyol resin includes a component selected from the group consisting of hydroxylated polycarbonate, hydroxylated polyester, polyurethane polyol, acrylic polyol, acrylic diol, and combinations thereof.

5. The coating composition of claim 1 wherein the at least one polyol resin includes silicone-modified hydroxylated polyester urethane resins.

6. The coating composition of claim 1 wherein the at least one polyol resin includes a hydroxylated polyester in an amount of 40 to 80 wt. % of the total weight of the coating composition;
   a polyurethane polyol in an amount of 1 to 10 wt. % of the total weight of the coating composition;
   an acrylic polyol in an amount of 1 to 10 wt. % of the total weight of the coating composition; and
   an acrylic diol in an amount of 1 to 10 wt. % of the total weight of the coating composition.

7. The coating composition of claim 1 wherein polyurethane crosslinker has at least 2 isocyanate groups available for crosslinking.

8. The coating composition of claim 1 wherein polyurethane crosslinker is an oligomer or polymer.

9. The coating composition of claim 1 wherein polyurethane crosslinker is an aliphatic oligomer of hexamethylene diisocyanate.

10. The coating composition of claim 1 further comprising one or more additives selected from the group consisting of rheology modifiers, viscosity adjusting agents, leveling agents, duller agents, surfactants, defoamers, organic solvents, pH adjusters, dispersants, coalescents, light stabilizers, biocides and combinations thereof.

11. A method comprising:
    applying a coating composition to a substrate to form an uncured coating on the substrate, the coating composition comprising:

at least one polyol resin having hydroxyl groups available for crosslinking wherein the at least one polyol resin includes a resin with glass transition temperatures less than 10° C.;

a polyurethane crosslinker that crosslinks the hydroxyl groups when cured; and water in an amount from about 4 to 20 wt. % of the total weight of the coating composition wherein solvents other than water are present in an amount less than half the amount of water; and curing the uncured coating to form a coated substrate.

12. The method of claim 11 wherein the uncured coating is cured by allowing the uncured coating to dry.

13. The method of claim 11 wherein the uncured coating is cured by heating.

14. The method of claim 11 wherein the at least one polyol resin has an equivalent weight from about 200 to 2500 with respect to the hydroxyl groups.

15. The method of claim 14 wherein the at least one polyol resin is a mixture of polyol resins including a polyol selected from the group consisting of a hydroxy-functional NMP-free polyester-urethane dispersion with a glass transition temperature less than -20° C., a hydroxy-functional polyacrylic dispersion with a glass transition temperature less than 0° C., and a polyester diol with a weight average molecular weight that is less than 1000 with a glass transition temperature less than −20° C.

16. The method of claim 11 wherein the at least one polyol resin includes a component selected from the group consisting of hydroxylated polycarbonate, hydroxylated polyester, polyurethane polyol, acrylic polyol, acrylic diol, silicone-modified hydroxylated polyester urethane resins, and combinations thereof.

17. The method of claim 11 wherein polyurethane crosslinker has at least 2 isocyanate groups available for crosslinking.

18. The method of claim 11 wherein polyurethane crosslinker is an aliphatic oligomer of hexamethylene diisocyanate.

19. A coating composition comprising:
at least one polyol resin having hydroxyl groups available for crosslinking;
a polyurethane crosslinker that crosslinks the hydroxyl groups when cured; and
water in an amount from about 4 to 20 wt. % of the total weight of the coating composition wherein solvents other than water are present in an amount less than half the amount of water and wherein the at least one polyol resin includes:
a hydroxylated polyester in an amount of 40 to 80 wt. % of the total weight of the coating composition;
a polyurethane polyol in an amount of 1 to 10 wt. % of the total weight of the coating composition;
an acrylic polyol in an amount of 1 to 10 wt. % of the total weight of the coating composition; and
an acrylic diol in an amount of 1 to 10 wt. % of the total weight of the coating composition.

* * * * *